US008540834B2

(12) United States Patent
Takamatsu

(10) Patent No.: US 8,540,834 B2

(45) Date of Patent: Sep. 24, 2013

(54) NOZZLE PLATE HOLDING DEVICE AND METHOD FOR MANUFACTURING INKJET HEAD

(75) Inventor: Hikaru Takamatsu, Hino (JP)

(73) Assignee: Konica Minolta IJ Technologies, Inc. (JP)

( * ) Notice: Subject to any disclaimer, the term of this patent is extended or adjusted under 35 U.S.C. 154(b) by 0 days.

(21) Appl. No.: 13/389,331

(22) PCT Filed: Jul. 26, 2010

(86) PCT No.: PCT/JP2010/062512

§ 371 (c)(1),
(2), (4) Date: Feb. 7, 2012

(87) PCT Pub. No.: WO2011/021475

PCT Pub. Date: Feb. 24, 2011

(65) Prior Publication Data

US 2012/0132350 A1 May 31, 2012

(30) Foreign Application Priority Data

Aug. 21, 2009 (JP) ................................ 2009-192604

(51) Int. Cl.
*B29C 65/00* (2006.01)
*B41J 2/16* (2006.01)

(52) U.S. Cl.
USPC .............. 156/196; 156/201; 156/443; 216/27

(58) Field of Classification Search
USPC ................................. 156/196, 200, 201, 443
See application file for complete search history.

(56) References Cited

U.S. PATENT DOCUMENTS

| | | | | |
|---|---|---|---|---|
| 4,953,287 | A * | 9/1990 | West et al. | 29/611 |
| 5,376,204 | A * | 12/1994 | Amano | 156/234 |
| 2003/0167637 | A1 | 9/2003 | Maeda et al. | |

FOREIGN PATENT DOCUMENTS

| | | | |
|---|---|---|---|
| JP | 2-2003 | A | 1/1990 |
| JP | 11-129485 | A | 5/1999 |
| JP | 11-198378 | A | 7/1999 |
| JP | 2002-307691 | A | 10/2002 |
| JP | 2003-159804 | A | 6/2003 |
| JP | 2003-326727 | A | 11/2003 |
| JP | 2007-76226 | A | 3/2007 |
| JP | 200776226 | A * | 3/2007 |

OTHER PUBLICATIONS

International Search Report for International Application No. PCT/JP2010/062512, mailed Aug. 31, 2010, with English translation.

* cited by examiner

*Primary Examiner* — Katarzyna Wyrozebski Lee
*Assistant Examiner* — Margaret Squalls
(74) *Attorney, Agent, or Firm* — Cantor Colburn LLP

(57) ABSTRACT

A nozzle plate holding device having a holding section which holds a nozzle plate arranged with a plurality of nozzles, and the nozzle plate holding device being used for bonding the nozzle plate, while the holding section holds the nozzle plate, onto a head chip arranged with a plurality of channels, wherein the holding section is configured to be capable of causing a distortion deformation of the nozzle plate in a direction that is parallel to a surface of the nozzle plate and crosses a length direction of the nozzle plate.

3 Claims, 5 Drawing Sheets

NOZZLE PLATE HOLDING DEVICE AND METHOD FOR MANUFACTURING INKJET HEAD

CROSS REFERENCE TO RELATED APPLICATIONS

This is a U.S. national stage of application No. PCT/JP2010/062512, filed on 26 Jul. 2010. Priority under 35 U.S.C. §119(a) and 35 U.S.C. §365(b) is claimed from Japanese Application No. 2009-192604, filed 21 Aug. 2009, the disclosure of which is also incorporated herein by reference.

TECHNICAL FIELD

The present invention relates to a nozzle plate holding device and a method for manufacturing an inkjet head, and specifically relates to the nozzle plate holding device and the method for manufacturing an inkjet head that are capable of keeping high precision positioning in cases of bonding a nozzle plate on a head chip.

BACKGROUND TECHNOLOGY

Among inkjet heads, there is a type of inkjet head where a plurality of nozzles are formed on a nozzle plate, and this nozzle plate is bonded on a head chip which has a plurality of channels, an ejection means to eject liquid in each channel, supply flow path of the liquid and the like, by using an adhesive agent.

As a method for bonding the nozzle plate on the head chip, a method to perform the following procedures, as shown in FIG. 13, is commonly used:

(a) Fixing nozzle plate 1 on holding device 100, by a suction force, magnetic force and the like;
(b) By handling nozzle plate 1, executes positioning of nozzle plate against head chip 2 such that each nozzle 11 and each channel 21 agree with each other;
(c) Pressing nozzle plate 1 on head chip 2; and
(d) Discontinuing the holding of holding device 100 to separate it from nozzle plate 1.

In FIGS. 13*a*-13*d*, code 10 indicates an adhesive layer. Adhesive layer 10 may be provided at the side of nozzle plate 1.

When the nozzle plate and the head chip are adhered, a fillet of adhesive is formed in a channel, however in cases where positioning precision of these parts is not sufficient, the adhesive filet becomes uneven with respect to the nozzle, which causes a bad influence for ejecting the ink or a problem of nozzle clogging. Therefore, to keep the precision positioning at the time of bonding is quite important.

Conventionally, there are technologies such as a method where the positioning and bonding processes are sought to be simplified by executing the positioning with a magnetic power of the nozzle plate having a magnetic adsorption force (Patent Document 1), a method where by holding for positioning the nozzle plate formed with a adhesive layer on the bonding surface between the head chip, with using a thermal ablation tape, and after the positioning and bonding the nozzle plate onto the head chip with thermal pressing, the nozzle plate is allowed to be separated (Patent Document 2).

PRIOR ART DOCUMENT

Patent Document

Patent Document 1: JP H11-198378A
Patent Document 2: JP H11-129485A

SUMMARY OF THE INVENTION

Problems to be Solved by the Invention

Generally, the nozzle plate is produced by forming a plurality of nozzles on a resin sheet by laser processing and the like. The nozzle plate with thin thickness makes a short nozzle length, which causes small energy loss at the time of droplet ejection, is preferable. Therefore the thin thickness of about several tens μm is required. Further, in recent years, an elongated inkjet head has been developed, the number of arranged nozzles has been increased, and the ink jet head has become high density. By these requirements, stiffness of the nozzle plate itself has been becoming lower and lower to be easily deformed.

Wherein, the nozzle plate deformation concerned in the present invention is a distortion deformation in the direction that is parallel to the nozzle plate surface and crosses the length direction of the nozzle plate. Because the deformation in the direction vertical to the nozzle surface is capable of being corrected by the pressing contact at the time of bonding to the head chip, however the deformation in the direction, that is parallel to the nozzle plate surface and crosses the length direction of the nozzle plate, cannot be corrected only by the pressing contact toward the head chip.

Here, the length direction of the nozzle plate is the direction along a length direction of nozzle low formed by arranging a plurality of nozzles. Not restricted to a single low, plural rows may be arranged on the nozzle plate.

When the nozzle plate is deformed, nozzle plate 1 is bonded on head chip 2 with deformed condition as shown in FIG. 14, and positional misalignment is generated between each nozzle 11 of nozzle plate 1 and each channel 21 of head chip 2, which causes a trouble for droplet ejection and clogging of nozzle 11, each affects a bad influence for landing of the ejected droplet.

Further, a performance of the ink jet head is determined by its nozzle figure. Namely, in cases where the nozzle figure is not uniform, the size of ejected droplet varies and the ejection direction and ejection velocity of the droplet vary to cause an influence to the droplet landing and image quality. If the nozzle plate is deformed, the nozzle figure is changed due to the deformation of the nozzle shape, and by being bonded with that condition to the head chip, the problems of affecting the bad influence to the droplet landing and image quality will be caused.

Patent Document 1 merely discloses to enable the easy positioning and bonding of the nozzle plate by utilizing the magnetic adsorption force inherent to the nozzle plate, and does not disclose about the means for correcting the deformation of the nozzle plate itself, which cannot solve the abovementioned problems.

On the other hand, according to Patent Document 2, it can be considered that since the nozzle plate is held by the thermal ablation tape until being bonded onto the head chip, the deformation of the nozzle plate can be prevented. However, causes of deforming the nozzle plate is not restricted to the figure of the nozzle plate itself, but are influences of various external forces exerted to the nozzle plate until being held by the holding device for bonding the head chip (such as ambient temperature or humidity affected at the time of handling). Therefore, even if the nozzle plate is held by the thermal ablation tape as in the case of Patent document 2, since the nozzle plate receives the various external forces and is already deformed at the time of being held by the thermal ablation tape, the nozzle plate will be held by the thermal ablation tape with the deformed condition.

However Patent document 2 does not disclose anything about the means for correcting the deformation of nozzle plate after having been held, therefore, the technology disclosed in Patent document 2 could not solve the bad influence to the droplet landing and image quality caused by the deformation of nozzle plate.

An objective of the present invention is to provide a nozzle plate holding device which is capable of high precision positioning between the nozzles in the nozzle plate and the channels in the head chip, by enabling the holding of the nozzle plate with the deformation corrected condition.

Further, another objective of the present invention is to provide an ink jet head manufacturing method which enables the high precision positioning between the nozzles in the nozzle plate and the channels in the head chip, by making capable of bonding the nozzle plate onto the head chip with the deformation corrected condition of the nozzle plate.

Other objectives of the present invention will be made obvious by the description below.

Means to Solve the Problems

The above described objective is achieved by each invention described below.

The invention described in claim 1 is a nozzle plate holding device provided with a holding section which holds a nozzle plate arranged with a plurality of nozzles, and the nozzle plate holding device being used for bonding the nozzle plate, while the holding section holds the nozzle plate, onto a head chip arranged with a plurality of channels, wherein the holding section is configured to be capable of causing a distortion deformation of the nozzle plate in a direction that is parallel to a surface of the nozzle plate and crosses a length direction of the nozzle plate.

The invention described in claim 2 is the nozzle plate holding device described in claim 1, wherein the holding section has two end holding units for folding the nozzle plate at both end parts of the nozzle plate, and one center holding unit for holding the nozzle plate at a central part, in the length direction of the nozzle plate, and wherein the nozzle plate holding device causes the distortion deformation of the nozzle plate by moving the center holding unit relatively to the both-ends holding units in the direction that is parallel to the surface of the nozzle plate and crosses the length direction of the nozzle plate.

The invention described in claim 3 is the nozzle plate holding device described in claim 2, wherein the center holding unit and the both-ends holding units are provided to be capable of independently moving toward a vertical direction to the surface of the nozzle plate.

The invention described in claim 4 is the nozzle plate holding device described in claim 1, wherein the holding section is formed along the length direction of the nozzle plate, and the holding section is configured such that a central part of the holding section is capable of being caused a distortion deformation relatively to both end parts of the holding section, in the direction that is parallel to the surface of the nozzle plate and crosses the length direction of the nozzle plate.

The invention described in claim 5 is the nozzle plate holding device described in any one of claims 1 to 4, wherein the holding section is formed with a through hole for confirming a deformation amount of the nozzle plate in a state of holding the nozzle plate.

The invention described in claim 6 is manufacturing method of an ink jet head for holding a nozzle plate arranged with a plurality of nozzles by a holding device, and bonding the nozzle plate held by the holding device onto a head chip arranged with a plurality of channels such that positions of the plurality of nozzles and positions of the plurality of channels coincide with each other, the method including the steps of holding the nozzle plate with the holding device; correcting a deformation of the nozzle plate, held by the holding device, by causing a distortion deformation of the nozzle plate in a direction that is parallel to a surface of the nozzle plate and crosses a length direction of the nozzle plate; and bonding the nozzle plate corrected of the deformation onto the head chip.

The invention described in claim 7 is a manufacturing method of an ink jet head for holding a nozzle plate arranged with a plurality of nozzles by a holding device, and bonding the nozzle plate held by the holding device onto a head chip arranged with a plurality of channels such that positions of the plurality of nozzles and positions of the plurality of channels coincide with each other, the method including the steps of: holding the nozzle plate with the holding device; after positioning and bonding both-ends portion of the nozzle plate onto the head chip, correcting a deformation of the nozzle plate by causing a distortion deformation of the nozzle plate in a direction that is parallel to a surface of the nozzle plate and crosses a length direction of the nozzle plate; and bonding a center part of the nozzle plate corrected of the deformation onto the head chip.

The invention described in claim 8 is a manufacturing method of an ink jet head described in claim 6 or 7, wherein the nozzle plate is bonded onto the head chip by adjusting a distortion amount of the nozzle plate, after making the distortion deformation of the nozzle plate, to be 10 μm or less.

Effect of the Invention

According to the nozzle plate holding device of the present invention, it is enabled to hold the nozzle plate in the state of corrected deformation, and to realize precision positioning between the nozzles in the nozzle plate and the channels in the head chip.

Further, according to the ink jet head manufacturing method of the present invention, it is enabled to bond the nozzle plate in the deformation corrected state onto the head chip, and to realize precision positioning between the nozzles in the nozzle plate and the channels in the head chip.

DETAILED DESCRIPTION OF THE PREFERRED EMBODIMENT

Hereinafter, embodiments of the present invention will be described.

In the present invention, the ink jet head is manufactured by the process of holding the nozzle plate arranged with a plurality of nozzles by a holding device, and bonding the nozzle plate being held by the holding device onto the head chip arranged with a plurality of channels so that the nozzle position and the channel position coincide with each other.

The head chip is provided with a channel row arranged with a plurality of channels. The number of the channel row may be one or more than one. The head chip functions as an actuator provided with a droplet ejection means for ejecting droplets from nozzles. As the droplet ejection means, there are a type of ejecting the liquid in a channel as a droplet by deforming the wall face; a type of providing a vibration plate faced inside a channel, and vibrating the vibrating plate by a piezoelectric device to eject the liquid in the channel as a droplet; and a type of providing a heat source in a channel, generating gas bubbles by heating the liquid in the channel, and by the bursting of the bubble, ejecting the liquid in the channel as a droplet. In the present invention, the type of droplet ejection means is not restricted, but any type of droplet ejection means is applicable.

In the nozzle plate, a plurality of nozzles is previously formed to have apertures along a length direction of the nozzle plate so as to correspond to each of channels in the head chip. As a material of the nozzle plate, resin, metal, and the like are utilized. In the present invention any of the material can be used, however, the present invention exerts a remarkable effect for a resin plate having tendency of easy deformation. As the resin for the plate, listed are for example: polyalkylene, polyethylene-terephthalate, polyimide, polyetherimide, polyether-ketone, polyether-sulfone, polycarbonate, athetylcellulose, polyphenilene-sulfide and the like.

The thickness of the nozzle plate is generally made to be 20 □m-300 □m. In the present invention a remarkable effect is exerted especially in the case of using a thin nozzle plate of 100 □m or less.

Figure 1:
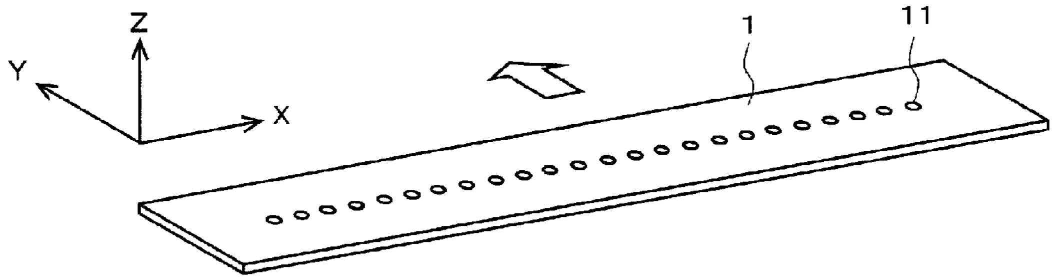
FIG. 1 is a perspective view of a nozzle plate.

In the case of bonding said nozzle plate onto the head chip, by holding the nozzle plate with the holding device, and after relatively positioning the nozzle plate being held with respect to the nozzle plate bonding surface of the head chip so that the nozzle position of nozzle plate and the channel position of head chip agree with each other, the nozzle plate and the head chip are relatively moved and bonded together. In the present invention, in the case of bonding the nozzle plate onto the head chip, the nozzle plate is bonded to the head chip after correcting the deformation by causing a distortion deformation of the nozzle plate in the direction that is parallel to the surface of the nozzle plate and crosses the length direction of the nozzle plate.

Wherein "causing a distortion deformation" means, as shown in FIG. 1, to relatively dislocate at least a part of the elongated nozzle plate with respect to other part in the crossing direction to the length direction (X direction) of nozzle plate 1, and preferably to dislocate the central part of nozzle plate 1 with respect to both ends portions in the perpendicular direction (Y direction) to the length direction of nozzle plate 1.

In general, the nozzle plate is deformed not only caused by the figure of the nozzle plate itself, but by influences of various external forces exerted to the nozzle plate until being held by the holding device for bonding the head chip. In the case of bonding the nozzle plate onto the head chip, by bonding the nozzle plate being held by the holding device in the state of causing the distortion deformation in the direction that is parallel to the surface of the nozzle plate and crosses the length direction of the nozzle plate, the nozzle plate can be bonded onto the head chip in the condition that the deformation is corrected. Therefore, the nozzle plate in the deformation corrected condition is enabled to be bonded onto the head chip, which enables the precision positioning between the nozzles in the nozzle plate and the channels in the head chip.

In order to cause the distortion deformation of the nozzle plate for correcting the nozzle plate deformation, by holding the nozzle plate with the holding device having at least three holding units arranged along the length direction of the nozzle plate, its center holding unit or both-ends holding units may be moved to the reverse direction to the deformation direction. Further, the center holding unit and the both-ends holding units may be moved to reverse directions to each other. Further, by making the length of the holding section to be the same as the length of the nozzle plate in longitudinal direction, said holding section may be made distortion deformation in the reverse direction to the direction of the nozzle plate deformation.

Figure 2:
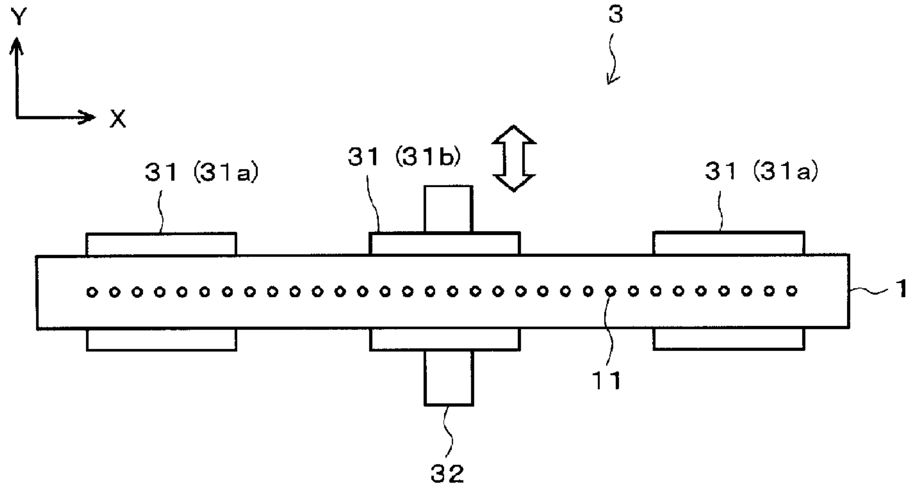
FIG. 2 is a plan view of a holding device in the state of holding the nozzle plate relating to the present invention.

FIG. 2 shows an example of the holding device, which is capable of causing the distortion deformation of the nozzle plate, shown in the state of holding the nozzle plate.

Holding device 3 has holding section 31 which holds nozzle plate 31 at multiple portions in the length direction (X direction) of nozzle plate 1. Holding section 31 shown in the present embodiment has both-ends holding units 31*a* for holding the near-end portions and center holding unit 31*b* for holding the central portion, and configured to hold at three portions along the length direction of nozzle plate 1.

Specific holding means of each holding section 31 to hold nozzle plate 1 is only required to surely hold the nozzle plate 1, and is not particularly restricted in the present invention. The type of holding means which sucks and holds the nozzle plate 1 by sucking air with the drive of suction pump is preferable, since it is capable of easily holding or releasing the nozzle plate 1 by driving or stopping the suction pump.

In the present embodiment, exemplified is a holding section which sucks and holds nozzle plate 1 by the drive of unillustrated suction pump. At the surface of each unit of holding section 31 (nozzle plate holding surface), a suction hole (not illustrated) is provided, and by sucking air through this suction hole, holding section 31 holds the nozzle plate 1, The length of each unit of holding section 31 in the perpendicular direction (Y direction) to the length direction of nozzle plate 1 is formed to largely exceed the width of nozzle plate 1 in Y direction. Among each unit of holding section 31, both-ends holding units 31*a* is disposed to be unmovable in Y direction, and center holding unit 31*b* is disposed to be movable on moving stage 32 extending along Y direction. Thus, center holding unit 31*b* is configured to be movable along moving stage 32 by prescribed amount reciprocally along Y direction. On moving stage 32, a position detection means (not illustrated) such as a linear encoder is provided which is configured to be capable of detecting the position (or moving amount) of center holding unit 31*b* in high precision.

Figure 3:
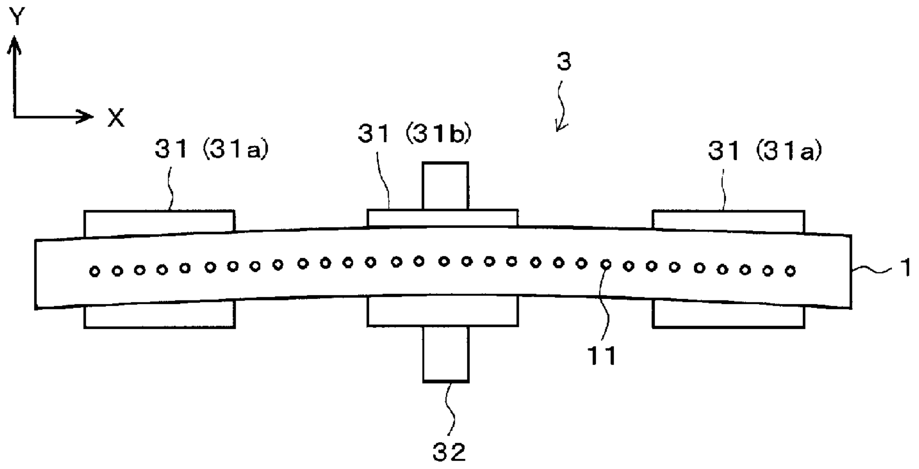
FIG. 3 is an explanation drawing of the manufacturing method of the ink jet head relating to the present invention, illustrating a plan view of the holding device shown in FIG. 2 in the state of holding the deformed nozzle plate.
Figure 4:
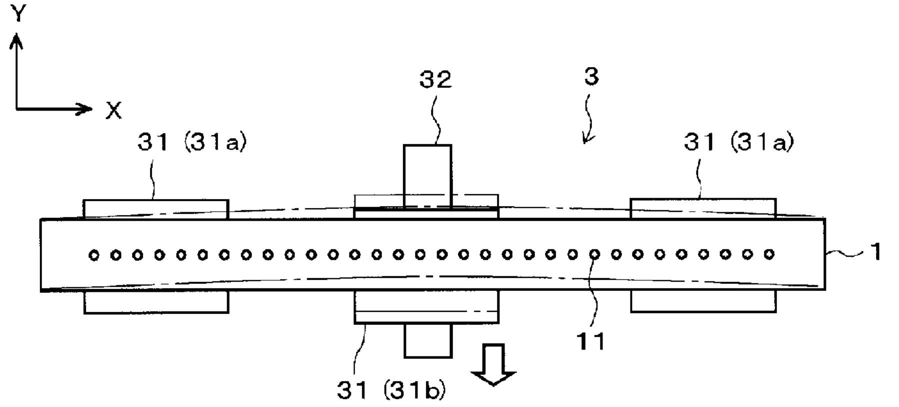
FIG. 4 is an explanation drawing of the manufacturing method of the ink jet head relating to the present invention, illustrating a plan view of the holding device shown in FIG. 2 in the state where the nozzle plate deformation has been corrected.
Figure 5:
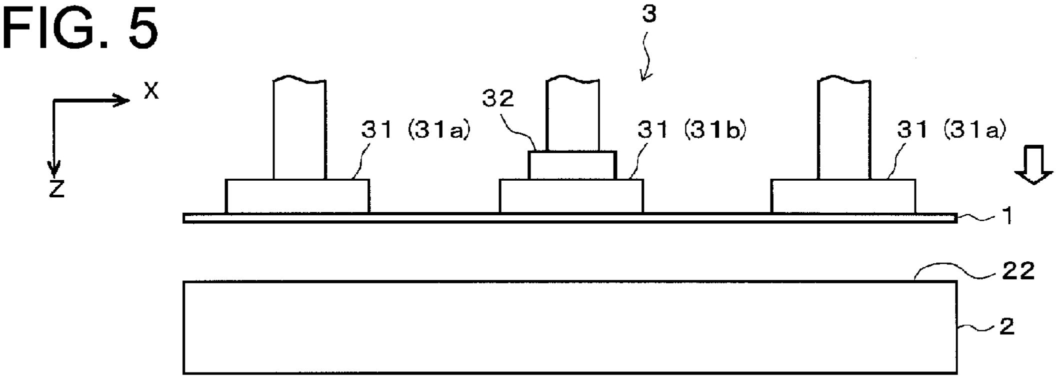
FIG. 5 is an explanation drawing of the manufacturing method of the ink jet head relating to the present invention, illustrating a side view in the state of bonding the nozzle plate having been corrected the deformation onto the head chip.

Next, the ink jet head manufacturing method for bonding nozzle plate 1 onto head chip 2 by using this holding device 3 will be described using FIG. 3 to FIG. 5. FIGS. 3 and 4 show plan views of holding device 3 holding nozzle plate 1, and FIG. 5 is a side view showing a manner of bonding the nozzle plate 1 onto the head chip 2.

Firstly, holding section 3 sucks and holds nozzle plate 1, which has been fanned of a plurality of nozzles 11, with each unit of holding section 31. Here, at the time of being held by the holding section, nozzle plate 1 is distorted at the center portion toward upward direction in the drawing along Y direction, and is totally deformed in an arc (FIG. 3).

Although the actual deformation of nozzle plate 1 is quite minute, the deformation amount is shown in exaggeration in FIG. 3 for the sake of explanation.

Next, by moving center holding unit 31*b* by a certain amount along moving stage 32 in the reverse direction (downward direction in the drawing) to the distortion direction of nozzle plate 1, to intentionally cause the distortion deformation of nozzle plate 1, the deformation of nozzle plate 1 is corrected. Thus, holding device 3 holds nozzle plate 1 in the state of corrected deformation (FIG. 4).

At this time, it is preferable to confirm, at the time when holding device 3 holds the nozzle plate 1, the amount of distortion before correction of nozzle plate 1 in Y direction, by using a suitable observation device such as a microscope and a camera to observe the positional relationship between nozzle 11 in nozzle plate 1 and channel 21 in head chip 2, and to determine the moving amount along moving stage 32 of center holding unit 31*b* based on the confirmed amount of distortion.

Wherein, it is preferable to make the distortion amount (adjusted by the moving amount of holding section 31), after nozzle plate 1 has been intentionally made distortion deformation, to be 10 μm or less. The smaller distortion amount is the more preferable, however, as a general guide, the distortion amount of 10 μm or less causes little adverse influence to image quality.

After the deformation of nozzle plate 1 has been corrected by the holding device 3, the positioning of nozzle plate 1 is executed by relatively moving holding device 3 in XY directions with respect to head chip 2. And, after positioning is executed so that each nozzle 11 in nozzle plate 1 and each channel 21 in head chip 2 coincides with each other, by concurrently moving each unit of holding section 31 of holding device 3 down toward head chip 2, the whole surface of nozzle plate 1 is bonded to the nozzle plate bonding surface 22 of head chip 2 (FIG. 5). Since nozzle plate 1 is bonded in the state of corrected deformation onto head chip 2, positional misalignment between each nozzle 11 and each channel 21 is not generated, and high precision positioning between nozzle plate 1 and head chip 2 can be realized.

The movement of holding device 3 and head chip 2 at the time of bonding is only required to be relative movement, therefore the head chip side may be moved upward, or both sides of holding device 3 and head chip 2 may be moved in the direction for contacting.

In the above described embodiment, each unit of holding section 31 of holding device 3 is configured to be moved concurrently all together toward head chip 2 for bonding nozzle plate 1, however, each unit of holding section 31 may be configured to be independently movable toward the perpendicular direction (Z direction) to the surface (bonding surface between head chip 2) of the nozzle plate 1 being held.

The method of bonding nozzle plate 1 onto head chip 2 by utilizing this type of holding device for manufacturing an ink jet head will be described referring the side view of FIG. 6.

Among each unit of holding sections 31 of holding device 3A shown in FIG. 6, two end holding units 31*a*, 31*a* and one center holding unit 31*b* are provided to be independently movable in Z direction.

Figure 6A:
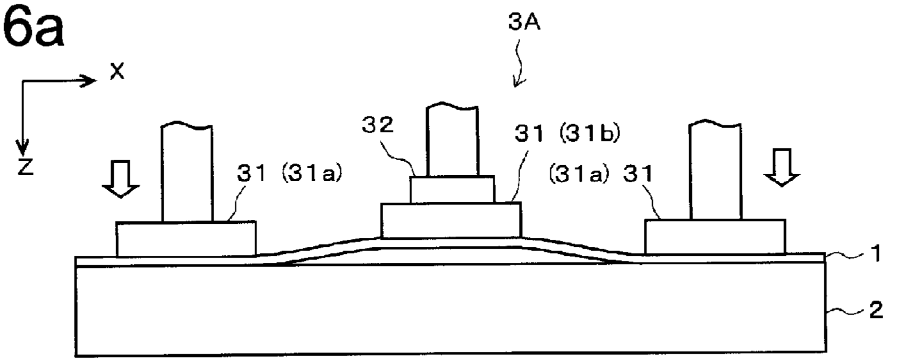
FIGS. 6*a* and 6*b* are explanation drawing of the manufacturing method of the ink jet head using the holding device relating to another embodiment of the present invention.

By sucking and holding the nozzle plate 1 with each unit of holding section 31 of said holding device 31A, positioning onto head chip 2 is executed, after that, only the each unit of both-ends holding units 31*a*, 31*a* is moved down toward head chip 2 before executing the deformation correction of nozzle plate 1, and both-ends sides of nozzle plate 1 is bonded onto head chip 2 (FIG. 6*a*).

After that, similarly to the above, by moving center holding unit 31*b* along moving stage 32 in reverse direction to the distortion direction of the deformed nozzle plate 1, the deformation of nozzle plate 1 is corrected.

Figure 6B:
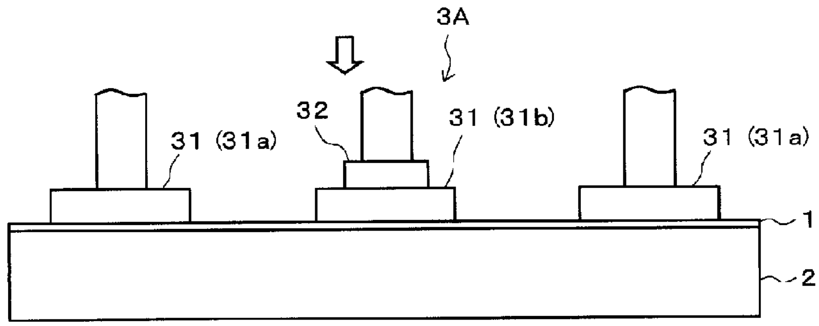

After correcting the deformation of nozzle plate 1, by moving center holding unit 31*b* in Z direction toward head chip 2, the center portion of nozzle plate 1 is bonded onto head chip 2 (FIG. 6*b*).

Figure 7:
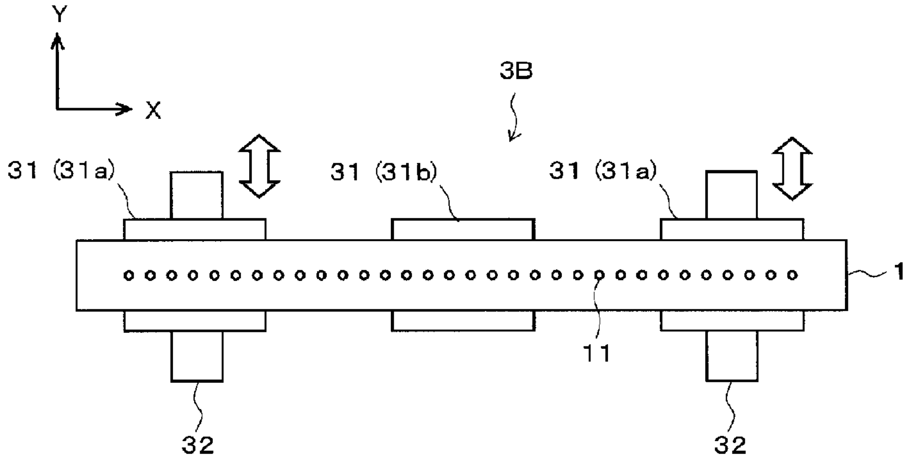
FIG. 7 is an explanation drawing of the holding device in the state of holding the nozzle plate relating to another more embodiment of the present invention.

In each embodiment described above, holding device 3 or 3A is configured such that only the center holding unit 31*b* is movable in Y direction among three units of holding section 31. However, as holding device 3B shown in FIG. 7, by configuring two end holding units 31*a*, 31*a* to be respectively movable along Y direction, only these both-ends holding units 31*a*, 31*a* may be respectively moved along the same Y direction at the time of correcting the deformation of nozzle plate 1. In this case, each moving amount of the two end holding units 31*a*, 31*a* may be made respectively different according to the deformation condition of nozzle plate 1.

After correcting the deformation of nozzle plate 1, said holding device 3B can be applied in the case of concurrently moving down each unit of holding section 31 and bonding nozzle plate 1 onto head chip 2.

Figure 8:
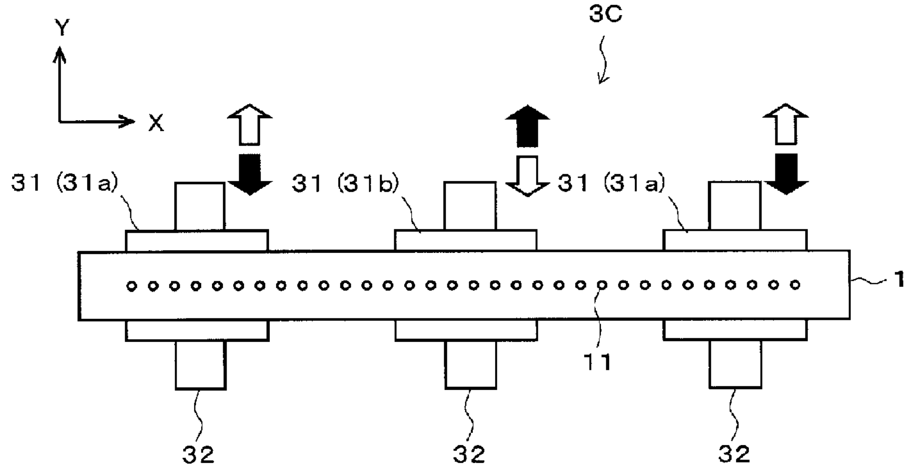
FIG. 8 is an explanation drawing of the holding device in the state of holding the nozzle plate relating to still another more embodiment of the present invention.

Further, holding device may be configured, as holding device 3C shown in FIG. 8, such that all units of holding section 31 are movable along moving stage 32 in Y direction. As the deformation correction mode of nozzle plate 1 by using this holding device 3C, the following modes are possible: (1) a mode of moving only center holding unit 31*b* in Y direction; (2) a mode of moving only two end holding units 31*a*, 31*a* in Y direction; (3) a mode of moving one center holding unit 31*b* and two end holding units 31*a*, 31*a* along Y direction toward opposite direction to each other.

In mode (2), each moving amount of the two end holding units 31*a*, 31*a* may be made respectively different according to the deformation condition of nozzle plate 1.

Further, in mode (3), moving amounts of every units of holding section 31 may be made respectively different according to the deformation condition of nozzle plate 1. Particularly, according to the mode (3), nozzle plate 1 is enabled of distortion deformation in detailed manner, which can realize high precision positioning.

After correcting the deformation of nozzle plate 1, said holding device 3C can be applied in the case of concurrently moving down the every units of holding section 31 and bonding nozzle plate 1 onto head chip 2, and also can be applied in the case of moving down only the two end holding units 31*a*, 31*a* toward head chip 2 and bonding the both end sides of nozzle plate 1 first.

Figure 9:
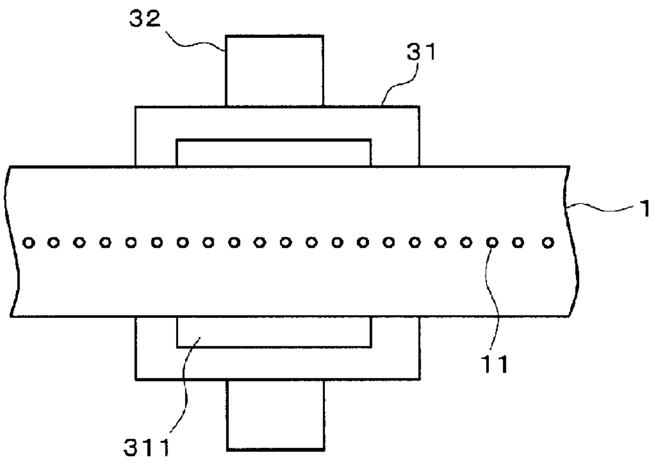
FIG. 9 is a partial plan view illustrating holding units of the other embodiment.

In the present invention, as shown in FIG. 9, holding section 31 to hold nozzle plate 1 is preferably formed with a through hole 311 for confirming the deformation amount of nozzle plate in a state of holding nozzle plate 1. The length of holding section 31 in Y direction in this case, is made to largely extend beyond the Y direction width of nozzle plate 1, and through hole 311 is also made to extend beyond the Y direction width of nozzle plate 1.

Figure 10:
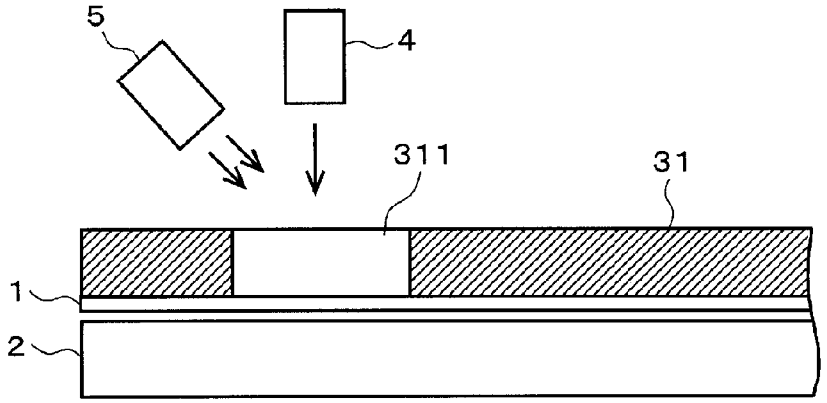
FIG. 10 is an explanation drawing illustrating a manner of observing the nozzle plate via a through hole of the holding units.

Due to this, as shown in FIG. 10, by observing nozzle plate 1 through said through hole 311 with using camera 4 and lighting device 5, from the opposite surface side to the nozzle plate holding surface of holding section 31, the deformation amount of nozzle plate 1 can be easily confirmed.

Such through hole 311 may be formed in every units of holding section 31, and may be formed only in the unit of holding section 31 which is configured movable on moving stage 32.

WORKING EXAMPLE

Distortion amounts of the nozzle plate after bonding to the head chip are compared between a case where the nozzle plate is bonded onto the head chip by using a conventional holding device having no correction means of nozzle plate deformation, and a case where the nozzle plate is bonded onto the head chip after being corrected of the nozzle plate deformation by using the holding device shown in FIG. 2.

<Specification of Nozzle Plate>

Nozzle plate length (X direction): 80 mm
Nozzle plate width (Y direction): 3 mm
Nozzle plate thickness (Z direction): 0.075 mm
Nozzle diameter: 30 μm
Nozzle pitch: 141 μm
Nozzle row: 2 rows
Number of nozzles: 512/row
Nozzle plate material: polyimide <Specification of Head Chip>

Channel width (X direction): 80 μm
Channel width (Y direction): 300 μm
Channel pitch: 141 μm
Head chip length (X direction): 80 mm
Head chip width (Y direction): 3 mm By utilizing each type of holding devices, works of bonding one piece of nozzle plate onto the head chip are repeated, and deformation amount of each nozzle plate after having been bonded is measured by using a camera.

Figure 11:
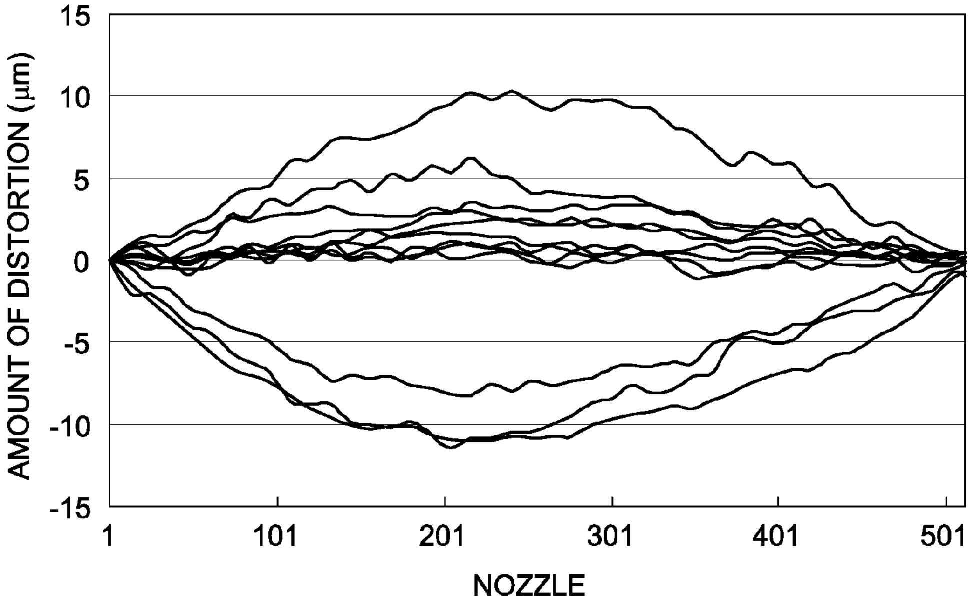
FIG. 11 is a graph showing the amount of distortion in a case of bonding the nozzle plate by using a conventional holding device.
Figure 12:
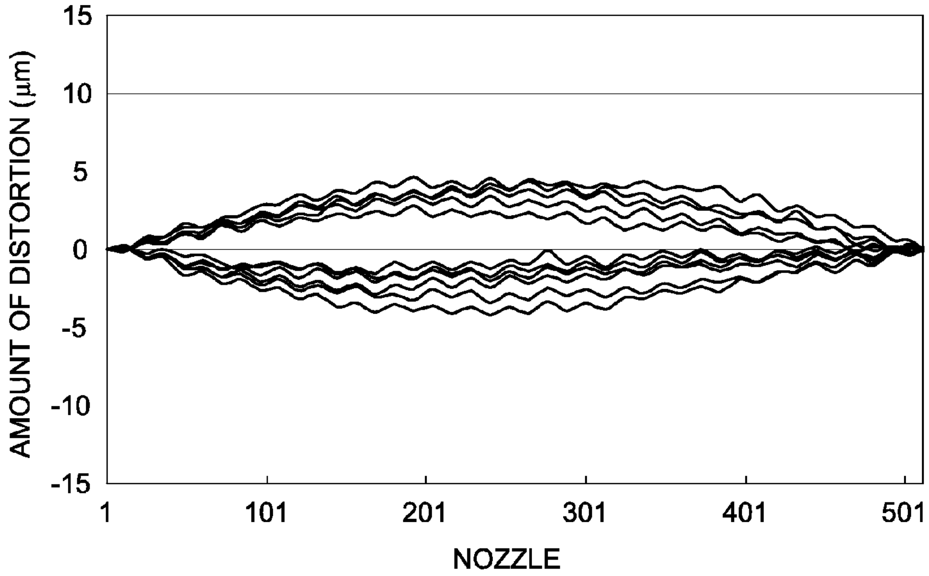
FIG. 12 is a graph showing the amount of distortion in a case of bonding the nozzle plate having been corrected the distortion by using the holding device shown in FIG. 2.
Figures 13A, 13B, 13C, 13D:
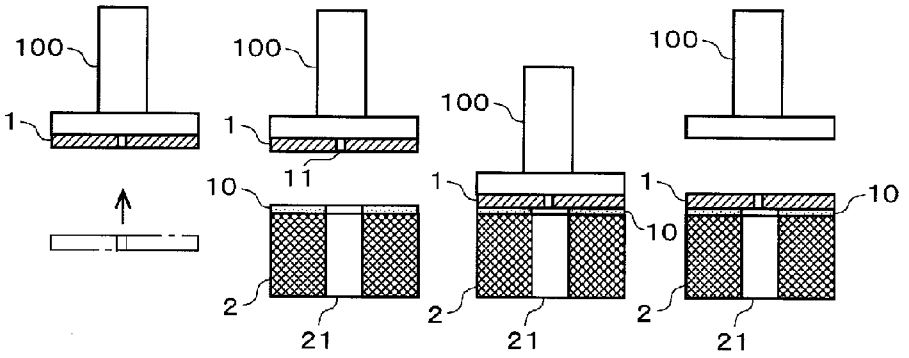
FIG. 13 is a process chart showing a conventional method of bonding the nozzle plate and the head chip.
Figure 14:
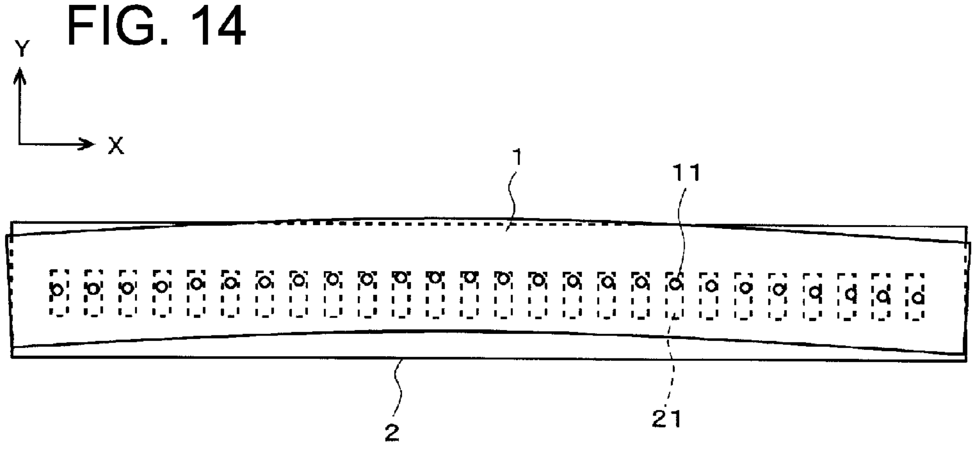
FIG. 14 is a perspective view showing conditions of the head chip and nozzle plate bonded by the use of conventional method.

The measurement results for the case of utilizing the conventional holding device are shown in FIG. 11, and the measurement results for the case of utilizing the holding device of FIG. 2 are shown in FIG. 12.

The distortion in Y direction of the nozzle plate is suppressed to smaller amount in the case of bonding by the use of holding device relating to the present invention, compared to the case of bonding by the use of conventional method. In this regard, it is proved that the nozzle plate is bonded with high precision positioning onto the head chip in the present invention.

EXPLANATION OF CODES

1: Nozzle plate
11: Nozzle
2: Head chip
21: Channel
22: Nozzle plate bonding surface
3, 3A-3C: Holding device
31: Holding section
31*a*: Both-ends holding unit
31*b*: Center holding unit
311: Through hole
32: Moving stage

What is claimed is:

1. A manufacturing method of an ink jet head for holding a nozzle plate arranged with a plurality of nozzles by a holding device, and bonding the nozzle plate held by the holding device onto a head chip arranged with a plurality of channels such that positions of the plurality of nozzles and positions of the plurality of channels coincide with each other, the method comprising the steps of:

holding the nozzle plate with the holding device;

correcting a deformation of the nozzle plate, held by the holding device, by causing a distortion deformation of the nozzle plate in a direction that is parallel to a surface of the nozzle plate and crosses a length direction of the nozzle plate; and bonding the nozzle plate corrected of the deformation onto the head chip.

2. A manufacturing method of an ink jet head for holding a nozzle plate arranged with a plurality of nozzles by a holding device, and bonding the nozzle plate held by the holding device onto a head chip arranged with a plurality of channels such that positions of the plurality of nozzles and positions of the plurality of channels coincide with each other, the method comprising the steps of:

holding the nozzle plate with the holding device;

after positioning and bonding both-ends portion of the nozzle plate onto the head chip, correcting a deformation of the nozzle plate by causing a distortion deformation of the nozzle plate in a direction that is parallel to a surface of the nozzle plate and crosses a length direction of the nozzle plate; and bonding a center part of the nozzle plate corrected of the deformation onto the head chip.

3. The manufacturing method of an ink jet head described in claim 1, wherein the nozzle plate is bonded onto the head chip by adjusting a distortion amount of the nozzle plate, after making the distortion deformation of the nozzle plate, to be 10 μm or less.

* * * * *